United States Patent [19]

Maxwell

[11] Patent Number: 5,301,724
[45] Date of Patent: Apr. 12, 1994

[54] OIL COLLECTING AND DISPENSING APPARATUS

[76] Inventor: Boyce A. Maxwell, 10527 Kirkvale, Houston, Tex. 77089

[21] Appl. No.: 906,501

[22] Filed: Dec. 4, 1991

Related U.S. Application Data

[63] Continuation-in-part of Ser. No. 624,348, Dec. 7, 1990, abandoned, which is a continuation-in-part of Ser. No. 464,425, Jan. 12, 1990, abandoned.

[51] Int. Cl.$^5$ .............................................. F16N 31/00
[52] U.S. Cl. .................................... 141/98; 141/338; 141/297; 220/573; 184/1.5; 184/106
[58] Field of Search .............. 141/98, 311 A, 312, 141/331–334, 337–342, 86–88, 297–300; 184/1.5, 105.1, 106; 220/571, 573, 86.1, 86.2; 206/223

[56] References Cited

U.S. PATENT DOCUMENTS

| | | | |
|---|---|---|---|
| Re. 27,449 | 8/1972 | Bartz | 220/86.1 |
| Re. 32,458 | 7/1987 | DeLay, Jr. | 220/86.1 |
| 521,113 | 6/1894 | Hart | 222/534 |
| 1,056,855 | 3/1913 | Tamagno | 222/534 |
| 1,554,589 | 9/1925 | Long | 184/1.5 |
| 1,568,830 | 1/1926 | Gunderson | 184/1.5 |
| 1,606,342 | 11/1926 | Bruce | 184/1.5 |
| 1,710,588 | 4/1929 | Nagy | 141/88 |
| 1,949,394 | 2/1934 | Martin | 184/1.5 |
| 1,949,777 | 3/1934 | Bristol | 184/1.5 |
| 2,531,288 | 11/1950 | Moore | 184/1.5 |
| 2,800,259 | 7/1957 | Wilson et al. | 222/534 |
| 3,410,438 | 11/1968 | Bartz | 220/573 |
| 4,010,863 | 3/1977 | Ebel | 220/573 |
| 4,098,398 | 7/1978 | Meyers | 206/223 |
| 4,114,644 | 9/1978 | Piper | 137/565 |
| 4,274,645 | 6/1981 | Ferguson et al. | 184/1.5 |
| 4,286,634 | 9/1981 | Wisner | 141/98 |
| 4,296,838 | 10/1981 | Cohen | 184/106 |
| 4,301,841 | 11/1981 | Sandow | 141/98 |
| 4,314,654 | 2/1982 | Gaubert | 222/536 |
| 4,355,737 | 10/1982 | Pongrass et al. | 222/536 |
| 4,403,692 | 9/1983 | Pollacco | 206/223 |
| 4,488,584 | 12/1984 | Heastehave et al. | 141/339 |
| 4,533,042 | 8/1985 | Pollacco | 206/223 |
| 4,557,395 | 12/1985 | DeLay | 220/86.1 |
| 4,632,268 | 12/1986 | Melzi et al. | 220/573 |
| 4,640,431 | 2/1987 | Harrison | 220/573 |
| 4,673,081 | 6/1987 | Habig et al. | 206/223 |
| 4,697,670 | 10/1987 | Arruda | 184/1.5 |
| 4,702,290 | 10/1987 | Perez | 141/332 |
| 4,706,719 | 11/1987 | Eversdijk | 141/98 |
| 4,756,411 | 7/1988 | Garland | 206/223 |
| 4,802,599 | 2/1989 | Hill | 220/573 |
| 4,856,568 | 8/1989 | Murphy et al. | 141/337 |
| 4,881,650 | 11/1989 | Bartz | 220/573 |

FOREIGN PATENT DOCUMENTS

| | | | |
|---|---|---|---|
| 8105429 | 12/1981 | Netherlands | 220/571 |
| 0149574 | 8/1920 | United Kingdom | 141/337 |

*Primary Examiner*—Henry J. Recla
*Assistant Examiner*—Casey Jacyna
*Attorney, Agent, or Firm*—Vaden, Eickenroht, Thompson, Boulware & Feather

[57] ABSTRACT

Apparatus for quick, clean and convenient changing of the oil or other fluids of a vehicle of particular use to the "do-it-yourselfer." The apparatus is sized so as to fit under most vehicles when resting on one side thereof and is provided with a pivoting extensible arm having a funnel mounted on the end thereof for collecting the fluid that is mounted in a recess in one side thereof so as not to catch on the undercarriage of the vehicle when slid under or out from under the vehicle. Once positioned, the funnel is raised into close approximation with the oil drain plug, oil filter neck, or other location from which fluid is to be collected, and the fluid is drained into the funnel and directed down through the arm into the container. The container is then stood upright for dispensing the stored oil or other fluid through a valve, which is also recessed in the container, into a larger recycling or other collection facility.

7 Claims, 4 Drawing Sheets

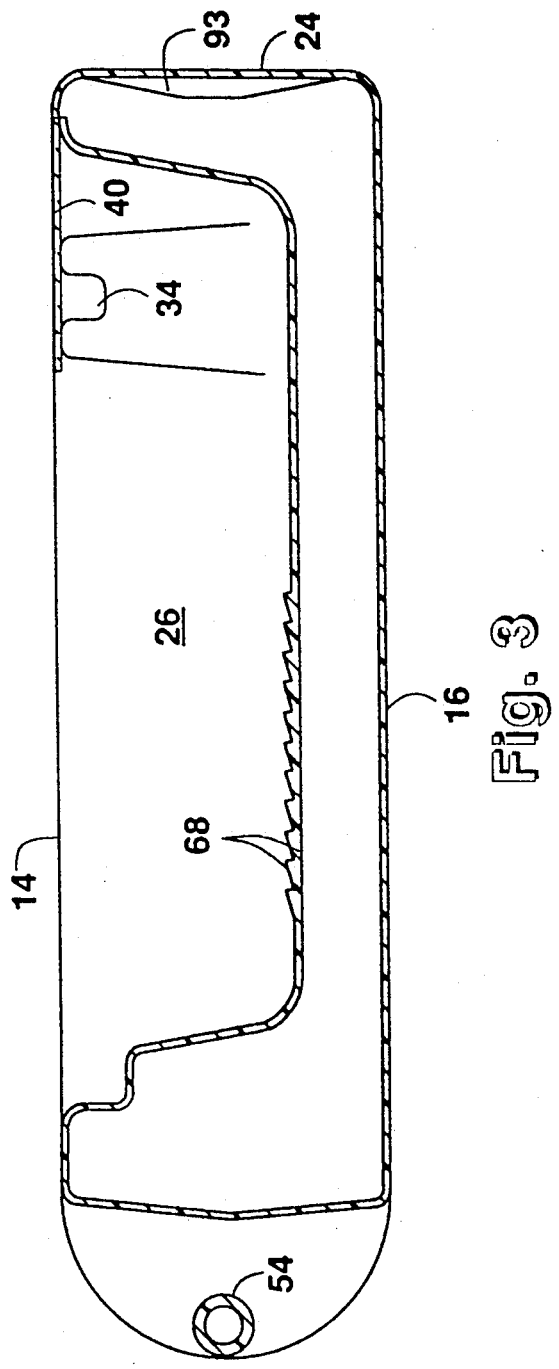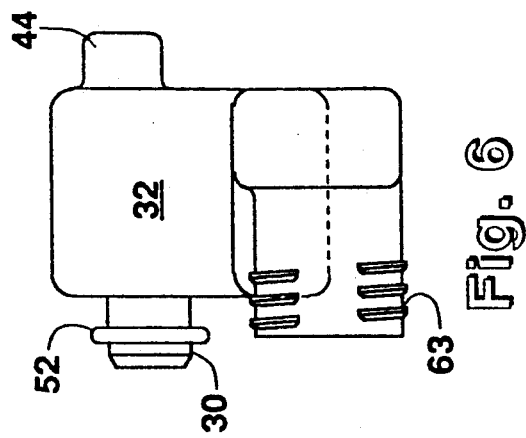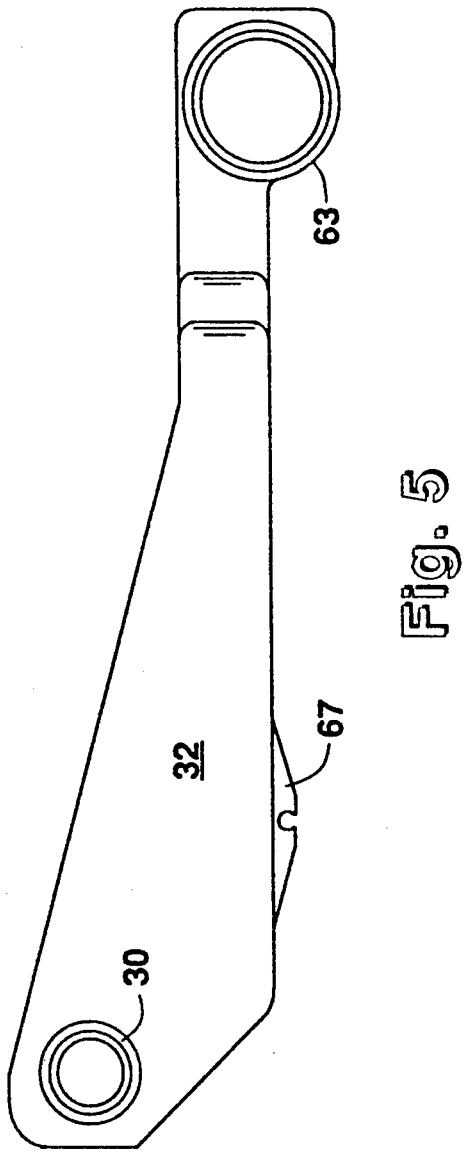

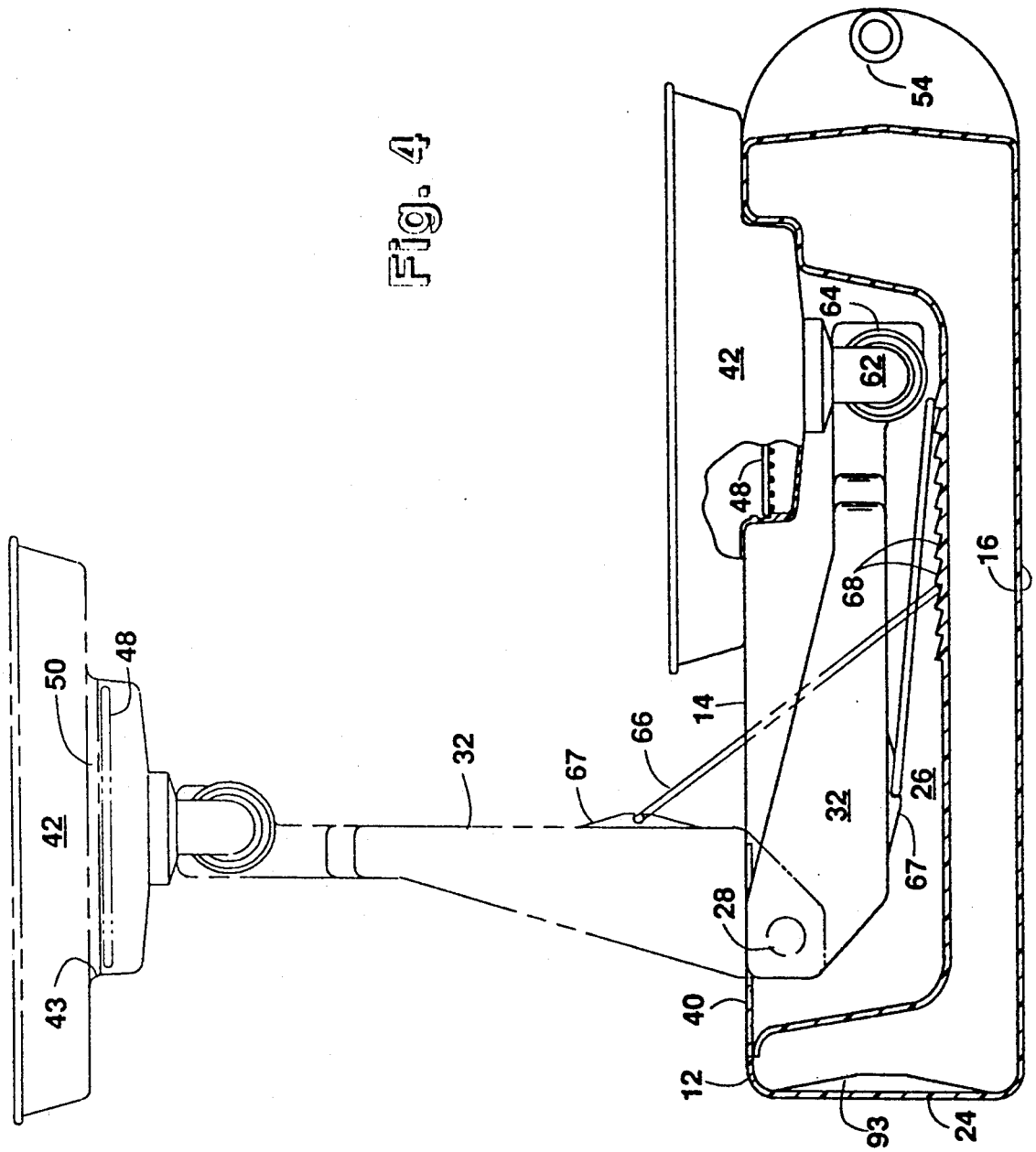

OIL COLLECTING AND DISPENSING APPARATUS

CROSS REFERENCE TO RELATED APPLICATION

The present application is a continuation-in-part application of my co-pending applications Ser. No. 07/624,348, filed on Dec. 7, 1990, now abandoned, which is a continuation-in-part of my co-pending application Ser. No. 07/464,425, filed on Jan. 12, 1990, now abandoned.

BACKGROUND OF THE INVENTION

The present invention relates to an apparatus for collecting used oil or other fluids, storing, and then dispensing that oil or other fluid at a later date. In more detail, the present invention relates to a container having an integral pivoting arm with a funnel mounted on the end thereof for collecting oil or other fluid drained from a vehicle which is used for storing the oil or fluid until it can be taken to a recycling point.

The reasons for making this invention have been recognized previously, and reference is made to U.S. Pat. No. 4,533,042 wherein the following, somewhat colorful, discussion characterizes the problems associated with the changing of the motor oil from, for instance, an automobile:

"As costs associated with operating and maintaining an automobile have risen, and as many former neighborhood gas stations have closed or converted to 'gas and go' stations which do not offer automobile servicing, more motorists have experimented with, or have switched over to, changing their own automotive motor oil.

"One undesirable consequence of this trend is the loss of a considerable amount of reusable oil from the petroleum refining and distribution system. Generally, when a car's oil is changed at a service station, the waste oil is saved at the station, from which it is periodically collected by the service station's supplier of new oil, or by an independent reprocessor. The collected waste oil is then rerefined into a useable product. Whereas many service stations have, as a convenience, or under direction by suppliers or governmental authority, established facilities to receive waste oil that is brought to the station by 'do-it-yourselfers' (hereinafter "DIY's"), these facilities have largely proved to be inconvenient both to the DIY's and to the dealers and much waste oil never makes it back from the DIY's to these facilities. Rather, it is sewered or run out on the ground, or disposed-of in municipal waste, i.e., put out in an unsegregated manner with the trash for collection and disposition at a landfill. In many urbanized areas, casually discarded, used motor oil has become a pollution menace, and the subject of uncharacteristic criminal behavior by otherwise moral and upstanding citizenry.

"One problem DIY's have with doing their part in recycling waste oil is that many automobiles hold five to seven quarts of oil, whereas most of the empty containers DIY's are likely to have readily available are four-quart containers. It only takes one time of seeing the last quart of draining dirty oil brim over the container and spill on the garage floor, street or ground to convince a novice DIY that he or she is incompetent to change the oil again, and is one reason why the oil is dumped illegally.

"Another problem DIY's have with such a project is that most conveniently available closeable containers that have a large enough capacity to hold all five to seven quarts of oil are too tall to fit under the car at the location from which oil is to be drained from the crankcase. Some DIY's decide upon discovering this problem to abandon the project and take the car to a service station, others move the car to a place (such as over a storm drain) where they can let the waste oil drain out without being collected. A particularly enterprising segment of DIY's devise a multi-step operation in which they first drain the waste oil from the crankcase into a low-sided, broad container such as a dishpan, and then pour it from the dishpan or the like into a jug that is too tall to have fit under the car in the first place, but which has the virtue of being closable. Some DIY's make the same mistake at this stage as was mentioned earlier: trying to pour five to seven quarts of oil into a four-quart container. Others cause spillage when they attempt this transfer without the aid of a funnel, or with an inadequate funnel. Besides the mess, this method can prove to be expensive, as when the DIY discards an expensive polyethylene dishpan after a single use because it has gotten too messy and did not work well for this purpose, and is another reason why the oil is dumped illegally.

"A further problem is that some collecting stations will only permit the deposit of used oil in approved containers, or will only permit the DIY's to deposit used oil by pouring from the brought-in containers, with the understanding that the emptied containers themselves may not be left at the station but must immediately be taken back by the DIY's who brought them."

In spite of this explicit explanation of the problems involved in changing the oil, the device described in that patent has not proved to be the answer such that there is still a need for a device which can solve the problems which are characterized in that patent. One particularly vexing problem, as noted in that patent, has been the problem of the size of the opening into the collector container and the distance between the opening into the container and the crankcase or other location on the vehicle from which oil is to be collected. So far as is known, this problem has only been addressed in U.S. Pat. No. 4,557,395 (and Reissue Pat. No. RE 32,458), which provides an elongate extension member having a flexible medial portion between the funnel and the container for positioning the funnel in close approximation with the point from which oil is to be collected. However, the extension member does not allow adjustment of the height of the funnel, nor is there provision made on that device for storage of that elongate extension member in a manner which is conducive to its ready availability and easy use. The object of the present invention is, therefore, to provide an apparatus which not only addresses the problems characterized so explicitly in U.S. Pat. No. 4,533,042, but which also remedies the deficiencies of the device disclosed in U.S. Pat. No. 4,557,395.

A further object of the present invention is to provide an apparatus for collecting, storing, and dispensing used motor oil and other fluids which not only solves the problems and/or overcomes the disadvantages and limitations of these known prior devices, but which also is capable of being manufactured and assembled at reasonable cost. This object, is of course, always desirable for commercial purposes, but the high cost of the design and manufacture of the molds for making large molded plastic parts (sometimes as high as hundreds of thousands of dollars for hardened molds suitable for mass production) must be balanced against, for instance, the labor costs involved for assembly such that a premium is placed upon molding parts which are easily assembled—so long as they will all fit in one or two multiple cavity molds. The present invention addresses that balance by, for instance, using a single molded part as both the main support member for the funnel which collects the fluid from the vehicle and as the conduit for routing the collected fluid directly into the container in which the fluid is stored.

Yet another object of the present invention is to provide an apparatus capable of holding a substantial amount of oil as well as means for filling the apparatus while at the same time achieving the previously mentioned objectives.

Other objects, and the advantages, of the present invention will be made clear to those skilled in the art by the following disclosure.

SUMMARY OF THE INVENTION

This object is achieved by providing an apparatus for use in collecting, storing, and dispensing used oil or other fluids comprising a container having a generally rectangular shape with first and second sides, a top, and a bottom having a recess formed in the first side thereof. One end of a pivoting arm having a passageway therethrough which opens into the container is mounted in the recess and a funnel is mounted on the other end of the arm with the outlet from the funnel in fluid communication with the passageway in the arm. The funnel is selectively positionable in a first, stored position in which the arm is positioned down in the recess, within the external confines of the container, and a substantial portion of the vertical dimension of the funnel is positioned within the recess when the container rests on the second side thereof for positioning the container under the vehicle from which oil or other fluid is to be collected and a second position in which the arm is extended to support the funnel in close approximation with the location from which oil or other fluid is to be collected from the vehicle, the oil or other fluid caught by the funnel being directed by the funnel down through the passageway in the arm into the container. A drain spout is mounted in a recess from which the spout does not protrude in the wall of the container near the bottom thereof and the interior of the spout is continuous with the interior of the container for dispensing the oil or other collected fluid out of the container.

BRIEF DESCRIPTION OF THE DRAWINGS

FIG. 3 is a sectional view of the apparatus of FIG. 2 taken along the line 2—2 in FIG. 2.

FIG. 4 is a partial sectional view of the apparatus of FIG. 1 showing the raising and lowering of the funnel and pivoting arm thereof.

FIG. 5 is a side elevational view of the arm for supporting the funnel and directing oil or other fluid into the apparatus of FIG. 1.

FIG. 6 is an end elevational view of the arm of FIG. 5.

DETAILED DESCRIPTION OF THE PREFERRED EMBODIMENT

Figure 1:
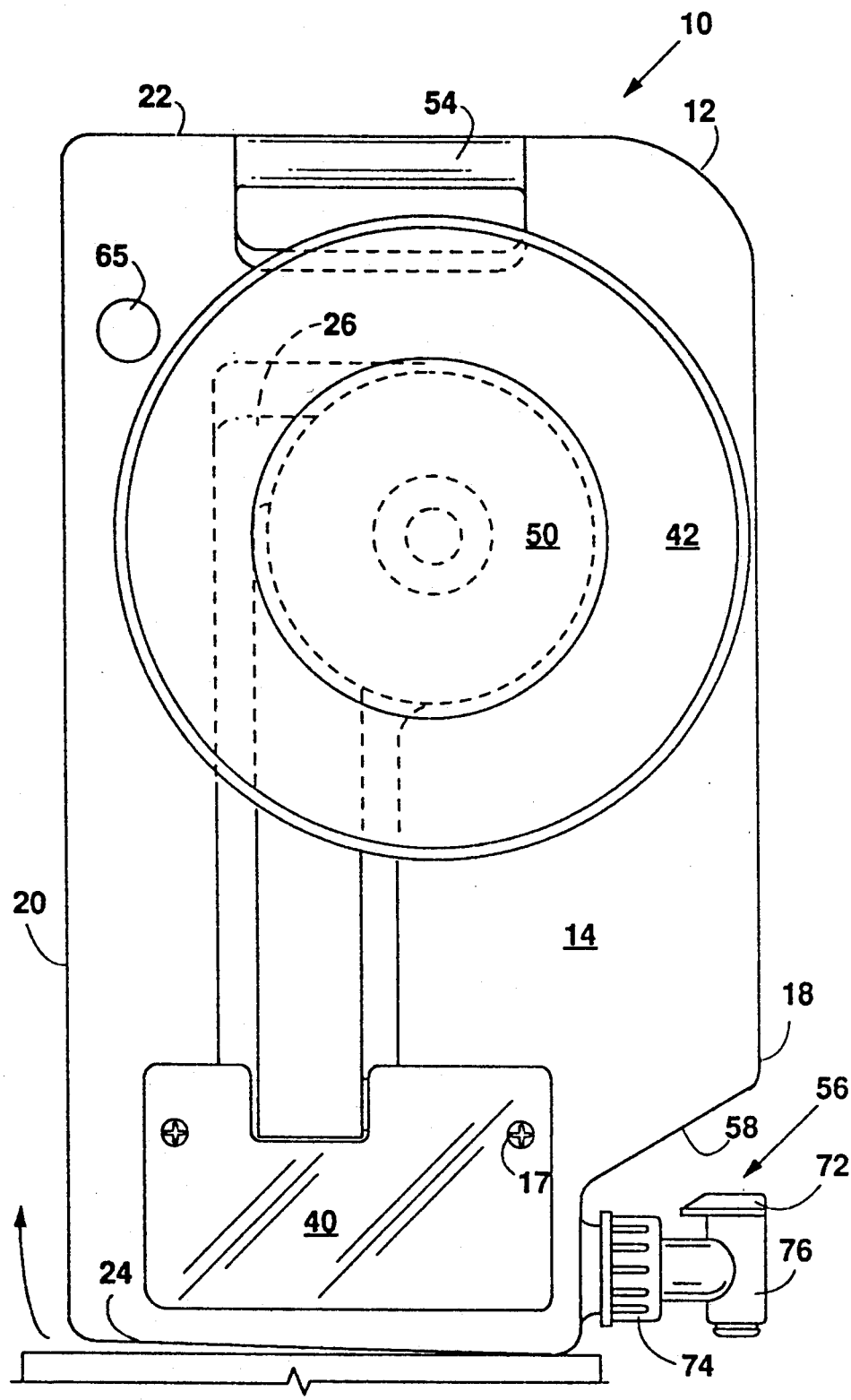
FIG. 1 is a side elevational view of a preferred embodiment of an apparatus constructed in accordance with the present invention showing the apparatus in an upright position for storing or dispensing previously collected used oil or other fluid.

A preferred embodiment of the apparatus of the present invention is indicated generally at reference numeral 10 and is comprised of a container 12 having other structure either formed integrally therewith or mounted thereto. Container 12 is generally rectangularly shaped with first and second sides 14 and 16, respectively, a front 18, back 20, top 22 and bottom 24. A recess 26 is formed in the first side 14 of container 12, and a pivoting arm 32 is mounted at the proximal end thereof in recess 26 on the axis formed by the dimple 44 formed integrally in one side of the proximal end of arm 32 (see FIG. 6) and the collar 30 formed in the other side of the proximal end of arm 32. The dimple 44 rests in the well 34 formed in the walls of recess 26 (see FIGS. 2 and 3) and the collar 30 is received within the corresponding sized hole 28 formed in the walls of recess 26 opposite the well 34. Arm 32 is held in place in well 34 by the hole 28, by a plate 40 mounted to the first side 14 of container 12, and by screws 17. An o-ring 52 is provided on the collar 30 for providing a fluid-tight fit in the hole 28 in the wall of recess 26.

Figure 2:
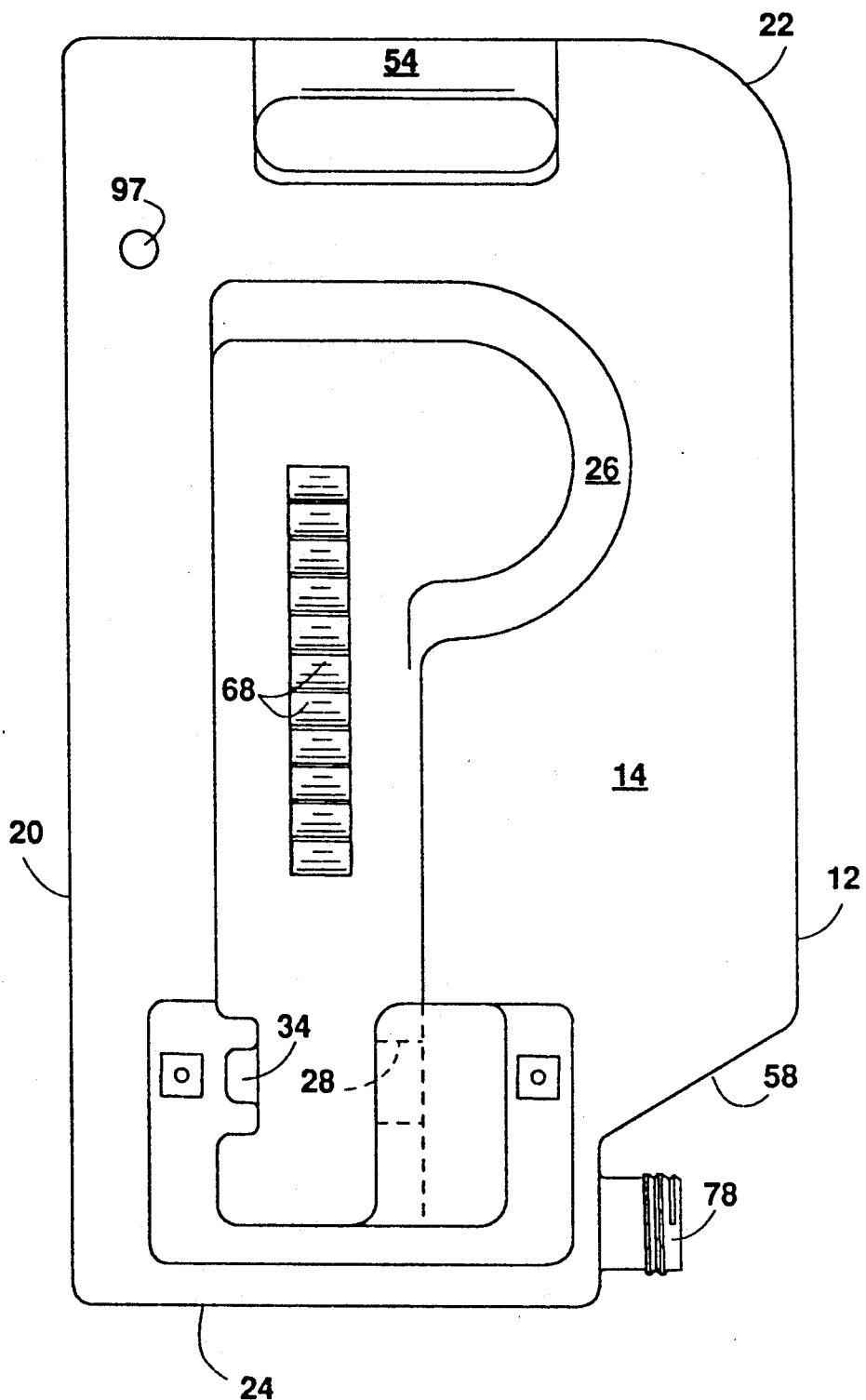
FIG. 2 is a side elevational view of the apparatus of FIG. 1 in an upright position with funnel, pivoting arm, and drain spout removed therefrom to show the details of the structure thereof.

A funnel 42 is mounted to the distal end of arm 32 by an elbow 62 which fits onto the screw threads 63 on the distal end of arm 32 and is provided with a screw collar 64 for fixing funnel 42 in a horizontal position when arm 32 is extended. Funnel 42 is provided with a grate, or strainer, 48 (shown in shadow lines in FIG. 4) to allow passage of oil or other fluid but prevent the loss of an oil drain plug or other hardware down into container 12. The portion of funnel 42 immediately above strainer 48 is preferably provided with an indentation, or shoulder, 43 formed in the walls of the funnel 42 to provide, with strainer 48, a flat surface on which an oil filter (not shown) can be turned upside down and left to drain down into container 12. A cap 50 (see FIG. 1) is provided for closing the funnel 42 to prevent any residual oil or other fluid which may coat the inside surface of elbow 62 or arm 32 from running out of funnel 42 when container 12 is stood in the upright position, e.g., when resting on bottom 24 as shown in FIGS. 1 and 2. Cap 50 is shown sized to fit down into funnel 42 and is provided with threads (not shown) to secure it in place to prevent cap 50 from being inadvertently stripped or knocked off the funnel 42. Those skilled in the art who have the benefit of this disclosure will recognize that cap 50 may also be sized to fit over the top of the funnel (for instance, snap on the top of the funnel) or just inside the top of funnel 42 with the same result.

Funnel 42 is pivoted from a first, stored position down in recess 26 (FIG. 4) to a second position in which arm 32 is extended, or raised, to position funnel 42 in close approximation with the location from which used oil or other fluid is to be collected for draining the oil or other fluid from the vehicle, the fluid being caught by funnel 42 and directed down through arm 32 into container 12 through the collar 30 and hole 28. In the preferred embodiment, funnel 42 can be raised as much as twenty (20) or more inches from the surface upon which the apparatus rests.

Recess 26 serves as a means for storing arm 32 and funnel 42 substantially within the external confines of container 12, e.g., so that the funnel 42 does not protrude significantly from the surface of the first side 14 of container 12, and because container 12 is sized to fit under most vehicles when resting on the second side 16 thereof, storing funnel 42 and arm 32 in that manner facilitates the positioning of the apparatus 10 under the vehicle. It is the ability of the funnel 42 to be raised and lowered in this fashion which is so important to the function of the apparatus 10 of the present invention. In other words, to facilitate the positioning of the apparatus 10 under a vehicle, the vertical dimension of the apparatus 10 when the apparatus rests on the second side 16 thereof must be minimized while at the same time providing for the raising of funnel 42 so as to be able to position funnel 42 in close approximation to a drain plug (not shown) which may be two feet or more above the surface on which the apparatus 10 rests. To accomplish this function, a significant portion of the vertical dimension (vertical with reference to when the apparatus 10 rests on the second side 16 thereof) of funnel 42 is positioned within the recess 26 when in the first, stored position. Coincidentally, the storing of the arm 32 and funnel 42 in that first position provides the first side 14 of container 12 with a relatively obstruction-free surface providing ease of storage of the apparatus 10 between uses. Once positioned under the vehicle from which oil or other fluid is to be collected, arm 32 and funnel 42 are pivoted until funnel 42 is positioned close to the crankcase drain plug, oil filter neck, radiator stopcock, transmission or brake fluid drain plug, or other location from which oil or fluid is to be collected so that the distance between the opening into container 12 is effectively reduced to insure that the fluid is collected by funnel 42 and directed into container 12.

Referring now to FIGS. 2 and 3, it can be seen that the bottom of recess 26 is provided with a plurality of notches 68 for receiving the free end of the rod 66 which is pivotally mounted to pivoting arm 32 by press fitting into a hole in an ear 67 formed integrally with pivoting arm 32. As shown in shadow lines in FIG. 3, as funnel 42 is raised upwardly by pivoting the arm 32 from the first, stored position to the second, extended position, the free end of rod 66 catches in one of the notches 68 to lock pivoting arm 32 in that second position.

Once the used oil or other fluid has been drained into container 12 through funnel 42 and arm 32, funnel 42 and arm 32 are returned to their first position and funnel 42 is closed with cap 50. The oil or other fluid can then be taken to a recycling and/or collecting station, the handle 54 formed in the top 22 of container 12 providing a convenient means for carrying the apparatus 10 when stood upright, e.g., when resting on the bottom 24 thereof. It is noted, however, the container 12 can be formed in sizes with capacities of over twelve quarts, plenty of capacity for the oil changes in most passenger vehicles, while still being small enough in external dimensions to allow the apparatus 10 to be positioned under all but the lowest sprung vehicles while resting on second side 16. Container 12 therefore also serves as a convenient storage container for used motor oil.

To dispense the used oil or other fluid collected in container 12, a drain spout 56 is mounted in a recess 58 in the wall of container 12 near the bottom 24 thereof. Drain spout 56 preferably does not protrude from the surface of the front 18 of container 12 and is continuous with the interior of container 12 for draining the fluid therefrom. For control of the flow of fluid therethrough, drain spout 56 is provided with a stopcock or spigot comprised of a vertical hollow cylinder 76 having a spool (not shown) pivotally mounted therein which controls the flow of fluid through drain spout 56. The spool is provided with a central bore (not shown) having a hole through the wall thereof which, when aligned with the opening from container 12 formed by the threaded outlet 78 by rotating an integral knurled knob 72, allows the oil or other fluid to flow through drain spout 56. Drain spout 56 is retained on threaded outlet 78 by a screw collar 74, preferably of the same size as screw 64.

As shown in FIG. 1, container 12 is "stood up" by resting container 12 on the bottom 24 thereof for dispensing the oil or other fluid collected therein. The back side of 20 of container 12 is provided with means for tipping container 12 when stood upright in the form of a recess, or finger hold, 93, for use by the "do-it-yourselfer" in tipping the erect container 12 toward drain spout 56 to cause oil or other fluid collected therein to flow downhill toward spout 56 to facilitate the dispensing of the fluid therefrom when container 12 rests on a surface 61. A vent plug 65 is disposed in a bore 97 located near the top 22 of container 12, e.g., within the recess around handle 54 so as not to protrude from the surfaces of container 12, to further facilitate the dispensing of oil from container 12.

Construction of the apparatus 10 of the present invention in this manner confers upon that apparatus the number of advantages which have been alluded to in the preceding paragraphs but which may be summarized as follows. First, the construction of apparatus 10 in this manner makes the external dimensions of container 12 such that container 12 will slide beneath all but the lowest-sprung automobiles but still have sufficient capacity for multiple oil changes or for use of the apparatus 10 in changing the oil of light trucks or other utility vehicles. Second, because none of the funnel 42, arm 32, or drain spout 56 protrude significantly from the surfaces of container 12 when in their respective stored positions and because neither handle 54 or vent plug 65 protrude from those surfaces, apparatus 10 is easily stored by the user and packaged and shipped by the manufacturer. Likewise, the construction of the apparatus 10 in this manner reduces the possibility of interferences of one of those structures with the underside of a vehicle when placed on second side 16 for sliding the apparatus 10 underneath the vehicle. Third, once positioned under the vehicle, funnel 42 is raised on arm 32 into close approximation with an oil drain plug or other point from which fluid is to be collected to insure that the oil or other fluid will drain into funnel 42 and not all over the user's hands, the floor or ground, or the outside surface of container 12. A fourth advantage of the apparatus 10 is the construction which prevents the messy leaking of the oil or other fluid coating the surfaces of the funnel 42 and pivoting arm 32 by use of the cap 50 which closes funnel 42. A fifth advantage of the described in the above-referenced U.S. Pat. No. 4,533,042, namely, storage of the member on which the funnel is mounted and which enables the funnel to be closely approximated with the location from which oil or other fluid is to be collected, by retracting funnel 42 into recess 26. A sixth advantage to the construction of the pivoting arm 32 having a collar 30 connected directly to recess 26 at hole 28 located near the top of the container 12 when container 12 rests on the second side 16 for allowing fluid draining into container 12 to substantially fill the container 12. Other advantages will be apparent to those skilled in the art who have the benefit of this disclosure.

Although the apparatus 10 has been described in terms of a presently preferred embodiment thereof, those skilled in the art who have benefit of the instruction set out herein will recognize that certain changes can be made to that preferred embodiment without altering the function or result of the various elements thereof. By way of example, reference has been made throughout the present specification and claims to the collecting and storing of used motor oil. However, the apparatus 10 is also used for collecting and storage of other fluids from sources other than internal combustion engines, and by the use of the word "oil", or the phrase "used motor oil", it is not the intention to be so restricted. A good example is the use of the apparatus 10 for collecting hydraulic fluid from heavy machinery or brake or transmission fluid. Reference is made to used motor oil because that is the presently preferred use of the invention and because the Patent Statute requires that an invention be described in terms of a "best mode contemplated by the inventor."

Those skilled in the art who have the benefit of the instruction set out herein will also recognize that changes can be made to the preferred embodiment shown in FIGS. 1-6 that would function in an equivalent manner to accomplish an equivalent result, and that such modifications are intended to fall within the spirit and scope of the following claims.

What is claimed is:

1. An apparatus for collecting fluid from a vehicle comprising:

a container having a generally rectangular shape with first and second sides, a top, and a bottom, and having a recess formed in the first side thereof;

an arm having a passageway therethrough which opens into said container pivotally mounted to said container in the recess formed in the first side thereof;

a funnel mounted on the end of said arm with the outlet from said funnel in fluid communication with the passageway in said arm, said funnel being selectively positionable in a first, stored position in which said arm and a significant portion of the vertical dimension of said funnel are both positioned within the recess formed in the first side of said container to minimize the height of said container when said container rests on the second side thereof and a second, raised position in which said funnel is positioned inclose approximation with the location from which a fluid is to be collected for draining the fluid from a vehicle into said funnel and down through the passageway in said arm into said container;

means for supporting said funnel in said second, raised portion; and a drain spout having a valve therein for opening to dispense the fluid collected in said container when said container is stood upright on the bottom thereof.

2. The apparatus of claim 1 wherein said first and second sides, top and bottom of said rectangular shape container form an external perimeter surface and said drain spout is mounted within a recess in said container and does not protrude from said surface.

3. The apparatus of claim 2 wherein said drain spout is positioned near the bottom of said container.

4. The apparatus of claim 2 wherein said container is provided with means for tipping said container toward said drain spout when said container is stood upright to facilitate the draining of fluid therefrom.

5. The apparatus of claim 1 additionally comprising a vent for facilitating the dispensing of fluid from said container when said container rests on the bottom thereof.

6. The apparatus of claim 1 wherein said funnel is provided with a removable cap for covering said funnel when said funnel is in said first, stored positioned.

7. The apparatus of claim 1 wherein the external dimensions of said container are such that said container is capable of fitting under a vehicle when resting on the second side thereof and when said funnel is in said first, stored position.

* * * * *